United States Patent Office 3,154,382
Patented Oct. 27, 1964

3,154,382
PROCESS FOR CATALYTICALLY REACTING HYDROGEN AND IODINE TO PRODUCE HYDROGEN IODIDE
Curtis F. Gerald, El Paso, Tex., assignor to El Paso Natural Gas Products Company, a corporation of Texas
No Drawing. Filed Oct. 24, 1962, Ser. No. 232,886
9 Claims. (Cl. 23—152)

The present invention relates to methods for accelerating the reaction between hydrogen and halogen which have found immediate and particular applicability in the preparation of hydrogen iodide in either anhydrous or aqueous forms. More particularly, this invention is directed to methods for catalytically promoting the reaction between hydrogen and iodine to provide hydrogen iodide.

Efficient execution of many commercial processes involving the use of hydrogen iodide as a catalyst, starting, or intermediate material, is often dependent upon not only a source of high purity hydrogen iodide but a source available in appreciable amounts at a cost commensurate with practical scale operation.

While the production of hydrogen iodide by the direct reaction of hydrogen and iodine provides hydrogen iodide of sufficiently high purity, it is generally handicapped by difficulties unavoidably inherent in the methods generally employed heretofore.

Thus, the preparation of hydrogen iodide prepared by the direct reaction of hydrogen and iodine has not met with commercial success mainly because the reaction is slow and the conversion is incomplete with concomitant low yields of desired product.

On the other hand, indirect processes for the manufacture of hydrogen iodide, as by the reaction of an iodide and an acid, while capable of providing substantial amounts of hydrogen iodide are often fraught with complications in the production and recovery of hydrogen iodide free from substantial impurities. In addition, since the operative steps involved in the purification of a reaction mixture containing the same are often sufficiently costly and complex, reliance upon these processes as a source of hydrogen iodide of high purity is considered highly uneconomical.

Accordingly, it is an object of the present invention to provide improved methods for the production of hydrogen iodide wherein the difficulties heretofore encountered are obviated to at least a substantial degree.

Another object of this invention resides in the provision of improved methods enabling the more efficient production of hydrogen iodide of high purity.

A further object of this invention resides in the provision of improved catalytic methods for the direct reaction of hydrogen and iodine to produce hydrogen iodide.

Still another object of this invention resides in the feature of improved catalytic methods for the production of hydrogen iodide in anhydrous or aqueous forms.

Still other objects of this invention will become more apparent from the following description thereof.

The present invention is based, in part, upon the discovery that iodine can readily be converted to hydrogen iodide, under commercially satisfactory process conditions, by contacting hydrogen and iodine in the presence of a catalytic quantity of an alumina-platinum-halogen catalyst.

The methods of the invention are broadly applicable to the conversion of iodine to hydrogen iodide regardless of source of elemental iodine charged to the process. Iodine, as presently available commercially, is considered satisfactory as a source of iodine to be charged to the reaction and is therefore preferred.

The hydrogen reacted with iodine in accordance with the invention is obtained from any suitable source, and may contain normally gaseous materials which are substantially inert under the conditions of execution of the process of the invention and which are readily separable from the hydrogen iodide product of the process. The presence of components in the hydrogen or iodine charge which are not readily removed from the product, and the presence of which is undesirable in the hydrogen iodide, are preferably removed therefrom by conventional means prior to introduction of these starting materials into the system. The iodine and/or hydrogen charged to the system may be subjected, for example, to any conventional purification step involving such operations as scrubbing, absorption, adsorption, dehydration, and the like, to effect the removal therefrom of normally gaseous, normally liquid or normally solid impurities. Thus, the normally gaseous streams charged to the process of the invention may be passed through suitable beds of solid contact materials such as, for example, adsorptive alumina, adsorptive clay, charcoal, silica gel, and the like, under conditions conducive to the separation of moisture or other impurities.

Interaction of the iodine and the hydrogen in the hydrogen iodide forming zone of the process is effected at any suitable conditions under which these components react with the formation of hydrogen iodide. A feature of the invention, however, is the execution of the reaction in the presence of an amount of the iodine either greater than or less than the molecular amount of hydrogen present depending on the end use for which the hydrogen iodide is destined. For example, where substantially pure anhydrous or aqueous hydrogen iodide, with almost no iodine impurity is desired, the mole ratio of iodine charged to the process will be maintained at a value less than 1 and preferably at a value of 0.15 or lower. On the other hand in certain processes it is advantageous to have some dissolved elemental iodine present in the hydrogen iodide, yet having the product free of any substantial amount of free hydrogen. One such process is the dehydrogenation of hydrocarbons described in Mullineaux et al., U.S. 2,890,253. In this instance the mole ratio of iodine charged to the process will be maintained at a value greater than 1 and preferably at a value in excess of 1.5. In general, a suitable ratio of iodine to hydrogen in the charge comprises, for example, from about 0.01 to about 10; particularly preferred conditions comprise the maintenance of the ratio of iodine to hydrogen in the range of from about 0.1 to about 5. Higher or lower proportions of the iodine may, however, be employed within the scope of the invention.

The reaction of the hydrogen with the iodine may be carried out at pressures ranging from about subatmospheric to superatmospheric. Suitable pressures comprise, for example, those in the range of from about atmospheric pressure to about 50 atmospheres.

Suitable temperature conditions to be maintained in the reaction zone comprise the use of a moderately elevated temperature. It is not particularly necessary to employ excessively high temperatures since temperatures in the range of from 100° C. to 400° C. are usually sufficient to initiate the reaction, there being no practical advantage to employing higher temperatures.

The catalysts which have been found effective in accelerating the reaction of hydrogen and iodine are catalytic composites consisting essentially of alumina, platinum, and halogen combined with the alumina in an amount of from about 0.1 percent to about 8.0 percent by weight of the alumina on a dry basis.

The catalyst may be prepared in any suitable manner, a particularly preferred method is to prepare alumina by adding a suitable reagent, such as ammonium hydroxide, ammonium carbonate, etc. to a salt of aluminum, such as aluminum chloride, aluminum sulfate, aluminum nitrate, etc. in an amount to form aluminum hydroxide which upon drying is converted to alumina and, in the interest of simplicity, the aluminum hydroxide is referred to as alumina in order that the percentages are based on alumina free of combined water. It has been found that aluminum chloride is generally preferred as the aluminum salt, not only for convenience in subsequent washing and filtering procedures, but also because it appears to give best results. Another suitable method is to react sodium aluminate with aluminum chloride or other suitable aluminum salt in order to prepare the alumina.

After the alumina has been formed, it is generally washed to remove soluble impurities. Usual washing procedures comprising washing with water, either in combination with filtration or as separate steps can be employed. It has been found that filtration of the alumina is improved when the wash water includes a small amount of ammonium hydroxide. The severity of washing will depend upon the particular method employed in preparing the catalyst. In one embodiment, the alumina is thoroughly washed with a suitable amount of water and preferably water containing ammonium hydroxide to reduce the chlorine content of the alumina to below about 0.1%. In another embodiment, this washing may be selective to retain chloride ions in an amount of from about 0.2% to about 5% by weight of the alumina on a dry basis. In accordance with this method of preparing the catalyst, the chloride ions are obtained from the original aluminum chloride and are retained in the alumina, thus avoiding the necessity of adding the halogen ions in a later step of catalyst preparation. However, it generally is difficult to control the washing procedure to retain the desired amount of halogen ion and, for this reason, it usually is preferred to wash the alumina to remove substantially all of the chloride ions and thereafter add the halogen ions in a controlled amount. The addition of the halogen ions in this manner permits better control of the amount of halogen ions being added. In another embodiment, the washing may be selective to retain the chloride ions in an amount constituting a portion of the total halogen desired, and the remaining portion of the halogen is then added in a subsequent step. In this method, the halogen ion may comprise the same halogen or a mixture of two different halogens, as for example, chlorine and fluorine.

In some cases it may be desired to commingle an organic acid and particularly acetic acid which has been found to have a favorable effect on the catalyst. The acetic acid apparently serves to peptize the alumina and thereby renders it in a better condition for compositing with the platinum, and also partly to fix the platinum on the alumina so that migration of the platinum during subsequent heating is minimized. The amount of acetic acid, when employed, will generally be within the range of from about 0.05 to about 0.5 mol of acetic acid per mol of alumina.

Alumina prepared in the above manner, after washing and filtration, is generally recovered as a wet cake. The wet cake is usually made into a slurry with water and sent to a separate zone for further handling. When the halogen ion is to be added separately, it preferably is done at this stage of the catalyst preparation, that is, before the platinum is commingled with the alumina. The halogen ion may be added in any suitable manner. However, the halogen should be added in a form which will readily react with the alumina in order to obtain the desired results and also must not leave undesired deposits in the catalyst. A preferred method of adding the halogen is in the form of an acid, such as hydrogen fluoride, hydrogen chloride, hydrogen bromide and/or hydrogen iodide. Hydrogen fluoride is preferably added as an aqueous solution for ease in handling and for control of the specific amount to be added. Another satisfactory source to be used for adding the halogen is the volatile salts, such as ammonium fluoride, ammonium chloride, etc. The ammonium ions will be removed during the subsequent heating of the catalyst and, therefore, will not leave undesirable deposits in the catalyst. In still another method, the halogen may be added as fluorine, chlorine, bromine, or iodine, but, in view of the fact that fluorine and chlorine normally exist as a gas, it is generally preferable to utilize them in the form of a solution for ease in handling. In some cases, the inclusion of certain components will not be harmful but may be beneficial, and in these cases the halogen may be added in the form of salts such as potassium fluoride, sodium fluoride, thorium fluoride, sodium chloride, potassium chloride, etc.

The concentration of halogen ion in the finished catalyst will be within the range of from about 0.1% to about 8% by weight of the alumina on a dry basis. The fluoride ion appears to be more active and therefore will be used within the range of from about 0.1% to about 3% by weight of the alumina on a dry basis. The chloride ion will be used within the range of from about 0.2% to about 8% and preferably from about 0.5% to about 5% by weight of the alumina on a dry basis.

After the alumina and halogen have been intimately mixed, the platinum may be added in any suitable manner. A particularly preferred method is to form a separate solution of chloroplatinic acid in water and introduce hydrogen sulfide into this solution at room temperature, until the chloroplatinic acid solution reaches a constant coloration; that is, will not change color upon the addition of more hydrogen sulfide. The chloroplatinic acid solution is normally light yellow and, upon addition of hydrogen sulfide gas, turns to a dark brown color. Apparently the chloroplatinic acid and hydrogen sulfide react to form one or more complex chemical compounds. Best results have been obtained in this method when the hydrogen sulfide is added at room temperature to the chloroplatinic acid solution. The addition of hydrogen sulfide at an elevated temperature of 175° F. appears to produce less satisfactory catalysts. The brown solution of chloroplatinic acid and hydrogen sulfide may then be commingled with the slurry of wet alumina gel at room temperature, and the slurry sufficiently stirred to obtain intimate mixing of the two solutions.

In the preferred embodiment, the platinum is added in an amount to produce a final catalyst containing from about 0.1% to about 1% by weight of platinum.

In another method of operation, chloroplatinic acid solution may be added to the slurry of alumina gel, and hydrogen sulfide then is added to the mixture. In this method of operation, it has been found that the hydrogen sulfide may be added at room temperature or at an elevated temperature of 175° F.

In some cases, satisfactory catalysts may be produced by commingling the chloroplatinic acid solution with the slurry of alumina gel, and then drying and heating in the manner hereinafter set forth. In this method, hydrogen sulfide is not used. However, the hydrogen sulfide addition is preferable because it tends to further fix the platinum in the form of an insoluble compound on the alumina so that the platinum compound will not migrate during the subsequent heating of the catalyst.

It has been found that best results are obtained when the platinum is composited with the alumina before the alumina is subjected to substantial heating.

After the platinum in proper concentration has been commingled with the alumina, the mixture is preferably dried at a temperature of from about 200° to about 400° F. for a period of from about 4 to 24 hours or more to form a cake. In some cases, it is desired to prepare the catalyst in the form of pills of uniform size and shape, and this may readily be accomplished by grinding the partially dried catalyst cake, adding a suitable lubricant, such as stearic acid, rosin, hydrogenated coconut oil, graphite, etc., and then forming into pills in any suitable pelleting apparatus. Particular satisfactory pills comprise those of a size ranging from about ⅛" x ⅛" to ¼" to ¼" or thereabouts. Pills of uniform size and shape may also be formed by extrusion methods. In some cases, it may be desired to utilize the catalyst as powder or granules of irregular size and shape, in which cases the pilling and extrusion operations may be omitted.

An alternative and especially advantageous procedure of preparing the alumina base for the catalytic composite is to partially neutralize a solution of an aluminum salt, such as aluminum chloride, with a base, such as ammonium hydroxide or organic bases such as hexamethylenediamine or mixtures, and to inject the partially neutralized solution into an oil bath as spherical drops. By dissolving an oil-soluble base in the oil and operating at a slightly elevated temperature, the drops are caused to gel. These gelled drops are aged in warm oil to harden them and are subsequently washed free of inorganic salts and excess halogen. They are then impregnated with platinum and adjusted in halogen content as described above.

The catalyst may now be subjected to high temperature treatment, and this may comprise one or several methods. Preferred method is to subject the catalyst to calcination at a temperature of from about 800° to about 1200° F. for a period of from about 2 to 8 hours or more. Another method is to subject the catalyst to reduction with hydrogen or hydrogen-containing gas at a temperature of from about 300° to about 600° F. for about 4 to 12 hours or more, preferably followed by calcination at a temperature of from about 800° to about 1200° F. In still another method, the catalyst may be subjected to reduction with hydrogen or hydrogen-containing gas at a temperature of from about 800° to about 1200° F. for a period of from about 2 to 10 hours or more.

In carrying out the methods of the invention, any suitable reactor, comprising for example, one of a tubular or chamber type may be employed to effect the catalytic conversion of hydrogen and iodine to hydrogen iodide.

The reaction can be effected in the liquid phase or in the vapor phase as desired. In carrying out the reaction in the liquid phase, iodine and water or other solvent can be mixed in any desired proportions and charged to a reaction zone packed with a catalyst bed containing a catalyst as described above. The reaction zone is maintained at the desired temperature and pressure while hydrogen is bubbled into the water-iodine-catalyst mixture. Other reaction media can be employed, if desired, such as acetic acid, carbon tetrachloride, toluene and the like.

When it is desired to initiate the reaction of hydrogen and iodine in the vapor phase, a source of iodine is vaporized in an iodine vaporization zone and a stream of iodine vapor and a stream of hydrogen gas are mixed and passed through a reaction zone packed with a catalyst bed comprising essentially a platinum on alumina composite promoted with halogen. Alternatively a stream of hydrogen gas can be directed through a heated quantity of molten iodine and the resulting iodine-laden hydrogen, essentially a mixture of hydrogen gas and iodine vapor, passed through the reaction zone. The reactor effluent from the reaction zone can then be collected in a solvent or by other means, as desired.

Having thus described the invention and its embodiments, the following examples are included as illustrative of the manner in which the invention can be carried out in accordance with the principles of the invention:

*Example 1*

To a three-necked, 5-l. round-bottomed flask fitted with a 300-watt heating mantle was added solid crystals of iodine. Into one of the side necks was fitted a gas dispersion tube for charging hydrogen into the flask. The center neck was fitted with a 900-mm. Pyrex distilling column packed with an upper and lower 2-inch layer of ¼-inch diameter Alundum spheres and a 24-inch middle layer (sandwiched between the Alundum layers) of platinum-alumina-halogen catalyst, about 0.37% by weight of platinum, about 98.71% by weight of alumina, and about 0.9% by weight of halogen ion—the halogen being a mixture of chlorine and fluorine in a 2:1 weight ratio and representing about 0.6 weight percent of chlorine and about 0.3 weight percent of fluorine. This catalyst column was heated by an external 3.5-kw. heater. To the catalyst column was connected a Graham condenser with vented receiver flask, the receiver flask being cooled in a Dry Ice-acetone bath.

The round-bottom flask was heated to melt the iodine crystals and to maintain them in a molten state at about 163° C. Hydrogen, at the rate of 0.51 cu. ft. per min. (0.50 mole per min.), was passed through the molten iodine. Iodine-laden hydrogen gas, carrying iodine at the rate of 0.035 pounds per min. (0.062 mole per min.), passed through the catalyst column reactor which was maintained at a temperature of 370° C. and atmospheric pressure. The mole ratio $I_2:H_2$ is $0.062/0.50=0.12$. The reactor effluent passed to the condenser and the product was collected in the receiver flask. The product contained 99.3% by weight of hydrogen iodide and 0.7% by weight of iodine.

*Example 2*

The apparatus of Example 1 was modified so that to the upper connection of the catalyst column reactor was attached a glass connector with opening for adding quench water to the reactor effluent. Example 1 was repeated with the addition of quench water at the rate of 13 ml. per min. to the reactor effluent. Upon condensation, an aqueous acidic product was collected in the receiver flask. Its composition comprised 53.2% by weight of hydrogen iodine, 0.4% by weight of iodine and 46.4% by weight of water.

*Example 3*

A tubular reactor, 2.5 inches in diameter, was packed to a depth of 24 in. with platinum-alumina-halogen catalyst, about 0.37% by weight of platinum, about 98.71% by weight of alumina, and about 0.9% by weight of halogen ion—the halogen being a mixture of chlorine and fluorine in a 2:1 weight ratio and represented about 0.6 weight percent of chlorine and about 0.3 weight percent of fluorine. The reactor was maintained at 370° C. and atmospheric pressure. Through an inlet, hydrogen was charged to the reactor at the rate of 0.0735 mole per min. Through a second inlet the reactor was simultaneously charged with 82.5 g. per min. of liquid consisting of 53.7% by weight of iodine (equivalent to 0.174 mole of iodine per min.), 18.3% by weight of hydrogen iodide, and 28.0% by weight of water. The mole ratio $I_2:H_2$ is $0.174/0.0735=2.4$. The gaseous effluent of the reactor was cooled. The vapors condensed to yield a liquid product consisting of 52.8% by weight of hydrogen iodide, 23.4% by weight of iodine, and 23.8% by weight of water.

What is claimed is:

1. The method of forming hydrogen iodide which comprises reacting hydrogen and iodine at an elevated temperature in the range of from 100° C. to 400° C. in the presence of a catalytic composite consisting essentially of alumina, platinum in an amount of from about 0.01 percent to about 1 percent by weight and halogen combined with the alumina in an amount of from about 0.1 percent to about 8.0 percent by weight of the alumina on a dry basis to form a mixture containing hydrogen iodide and recovering the hydrogen iodide thus produced.

2. The method according to claim 1 wherein the halogen is chlorine.

3. The method according to claim 1 wherein the halogen is fluorine.

4. The method of forming hydrogen iodide which comprises reacting hydrogen and iodine in a mole ratio of iodine to hydrogen of from about 0.1 to about 10 at an elevated temperature in the range of from 100° C. to 400° C. in the presence of a catalytic composite consisting essentially of alumina, platinum in an amount of from about 0.01 percent to about 1 percent by weight and halogen combined with the alumina in an amount of from about 0.1 percent to about 8.0 percent by weight of the alumina on a dry basis to form a mixture containing hydrogen iodide and recovering the hydrogen iodide thus produced.

5. The method of forming hydrogen iodide which comprises reacting hydrogen and iodine in a mole ratio of iodine to hydrogen of less than 1 at an elevated temperature in the range of from 100° C. to 400° C. in the presence of a catalytic composite consisting essentially of alumina, platinum in an amount of from about 0.01 percent to about 1 percent by weight and halogen combined with the alumina in an amount of from about 0.1 percent to about 8.0 percent by weight of the alumina on a dry basis to form a mixture containing hydrogen iodide and recovering the hydrogen iodide thus produced.

6. The method of forming hydrogen iodide which comprises reacting hydrogen and iodine in a mole ratio of iodine to hydrogen of at least 1.5 at an elevated temperature in the range of from 100° C. to 400° C. in the presence of a catalytic composite consisting essentially of alumina, platinum in an amount of from about 0.01 percent to about 1 percent by weight and halogen combined with the alumina in an amount of from about 0.1 percent to about 8.0 percent by weight of the alumina on a dry basis to form a mixture of hydrogen iodide and iodine substantially free of hydrogen and recovering the hydrogen iodide thus produced.

7. The method according to claim 4 wherein the halogen is chlorine.

8. The method according to claim 4 wherein the halogen is fluorine.

9. The method according to claim 4 wherein the halogen comprises a mixture of chlorine and fluorine.

References Cited in the file of this patent

J. W. Mellor's "A Comprehensive Treatise on Inorganic and Theoretical Chemistry," vol. 2, 1922 ed., page 170, Longmans, Green and Company, New York.

UNITED STATES PATENT OFFICE
CERTIFICATE OF CORRECTION

Patent No. 3,154,382            October 27, 1964

Curtis F. Gerald

It is hereby certified that error appears in the above numbered patent requiring correction and that the said Letters Patent should read as corrected below.

Column 4, line 49, for "0.1%" read -- 0.01% --; column 5, line 3, for "Particular" read -- Particularly --; line 4, for "to" read -- × --; column 6, line 37, for "iodine", first occurrence, read -- iodide --.

Signed and sealed this 4th day of May 1965.

(SEAL)
Attest:

ERNEST W. SWIDER            EDWARD J. BRENNER
Attesting Officer            Commissioner of Patents